United States Patent
Khabashesku et al.

(10) Patent No.: US 8,945,301 B2
(45) Date of Patent: Feb. 3, 2015

(54) METHOD OF PRODUCING DIAMOND POWDER AND DOPED DIAMONDS

(75) Inventors: Valery N. Khabashesku, Houston, TX (US); Valery A. Davydov, Trotsk (RU); Alexandra V. Rakhmanina, Trotsk (RU)

(73) Assignee: University of Houston System, Houston, TX (US)

( * ) Notice: Subject to any disclaimer, the term of this patent is extended or adjusted under 35 U.S.C. 154(b) by 852 days.

(21) Appl. No.: 13/204,205

(22) Filed: Aug. 5, 2011

(65) Prior Publication Data

US 2012/0032116 A1 Feb. 9, 2012

Related U.S. Application Data

(60) Provisional application No. 61/371,104, filed on Aug. 5, 2010.

(51) Int. Cl.
| | |
|---|---|
| *C30B 29/04* | (2006.01) |
| *C01B 31/06* | (2006.01) |
| *B01J 3/06* | (2006.01) |
| *B82Y 30/00* | (2011.01) |
| *C09K 11/65* | (2006.01) |

(52) U.S. Cl.
CPC ............... *C01B 31/06* (2013.01); *B01J 3/062* (2013.01); *B82Y 30/00* (2013.01); *C09K 11/65* (2013.01); *B01J 2203/0605* (2013.01); *B01J 2203/061* (2013.01); *B01J 2203/0655* (2013.01); *B01J 2203/068* (2013.01); *C01P 2002/60* (2013.01); *C01P 2004/61* (2013.01); *C01P 2004/62* (2013.01); *C01P 2004/64* (2013.01)
USPC ............ 117/2; 117/3; 117/8; 117/9; 117/929; 423/446

(58) Field of Classification Search
USPC .......................... 117/929, 2, 3, 8, 9; 423/446
See application file for complete search history.

(56) References Cited

U.S. PATENT DOCUMENTS

| | | | | |
|---|---|---|---|---|
| 4,023,066 | A * | 5/1977 | Smulders .................. | 315/209 R |
| 5,772,756 | A * | 6/1998 | Davies et al. .................... | 117/79 |
| 7,101,433 | B2 * | 9/2006 | D'Evelyn et al. ................ | 117/69 |
| 7,300,441 | B2 * | 11/2007 | Haid et al. ........................ | 606/90 |
| 7,323,049 | B2 * | 1/2008 | Sung ............................... | 117/79 |
| 7,585,266 | B2 * | 9/2009 | Baner et al. .................... | 493/267 |
| 7,820,130 | B2 * | 10/2010 | Khabashesku et al. ........ | 423/446 |
| 7,910,083 | B2 * | 3/2011 | Twitchen et al. ............. | 423/446 |
| 8,110,041 | B2 * | 2/2012 | Twitchen et al. ................. | 117/2 |

* cited by examiner

*Primary Examiner* — Bob M Kunemund
(74) *Attorney, Agent, or Firm* — Conley Rose, P.C.

(57) ABSTRACT

A method for producing a diamond material by contacting a fluorinated precursor with a hydrocarbon in a reactor and forming a combination in the absence of a metal catalyst; increasing the pressure of the reactor to a first pressure; heating the combination under pressure to form a material precursor; cooling the material precursor; and forming a diamond material.

33 Claims, 7 Drawing Sheets

METHOD OF PRODUCING DIAMOND POWDER AND DOPED DIAMONDS

CROSS-REFERENCE TO RELATED APPLICATIONS

This application claims the benefit under 35 U.S.C. §119(e) of U.S. Provisional Application No. 61/371,104, filed on Aug. 5, 2010, the disclosure of which is hereby incorporated herein by reference.

BACKGROUND

1. Field of the Invention

The present invention relates to methods of making diamond powder, and doped diamonds from a hydrocarbon and fluorocarbon mixture.

2. Background of the Invention

Thermal decomposition of solid hydrocarbons of different molecular structure and types of carbon bonding under a pressure (P) of 8 GPa and temperature (T) of 1500° C. are known. It has been shown that heating naphthalene under such conditions, causes its chemical decomposition into a carbon residue and volatile gases. Depending on the heating temperature and duration of heating, (time (t) the carbon residue crystallizes in different crystal forms. When heated for 1 min, the carbon residue crystallizes in a mixture of: two-dimensionally ordered carbon (at T=500-600° C.), three-dimensionally ordered carbon (such as graphite with an interplanar distance ($d_{002}$) from 0.3440 nm at T=700° C. to 0.3354 nm at T=1150° C.), and complete conversion to diamond at T=1300° C. It has also been observed that when graphite is in contact with naphthalene at an internal surface of a graphite boat heater, it transforms into diamond at a pressure of 8 GPa and a temperature of 1300° C.

Experimentation with naphthalene to yield diamond from graphite, helped elucidate that along with pressure, temperature and time, the concentration (c) of chemically bonded hydrogen (in the graphite reaction zone of the high pressure apparatus), is important. Such concentrations can be varied by changing the ratio (a/b) of components in finely dispersed mixtures of graphite and naphthalene ($C_{10}H_8$):

$$aC_{graphite} + b\ C_{10}H_{8\ naphthalene} \quad (1)$$

It is known that when the concentration of bonded hydrogen is equal or higher than 1% of the total mass of the mixture (i.e., mass ratio of graphite and naphthalene in the homogeneous mixture is 5.25:1), all the carbon residue of the mixture (1) converts into diamond under conditions where:

$$P=8\ GPa,\ T=1300°\ C.,\ and\ t=20\ sec \quad (2)$$

Thermobaric treatment of mixtures of graphite and naphthalene at a concentration below 1 wt. % causes a drop in the yield of diamond, so that at (c)≤0.3% (i.e., at mass ratio of graphite to naphthalene about 20:1) virtually no diamond is formed under the experimental parameters (2). Research by Bundy F. P. entitled "Direct conversion of graphite to diamond in static pressure apparatus" (*J. Chem. Phys.* 1963, V. 38, N 3, pp. 631-643); as well as that of Vereschagin L. F. et al. entitled "Direct transformation of graphite into diamond under high static pressures," (*Doklady AN SSSR.* 1972, V. 206, N1, pp. 78-79), show that direct (catalyst-free) transformation of graphite into diamond requires pressures above 12 GPa and at temperatures of about 3000° C. Such high pressure and high temperature ranges makes the commercial synthesis of such material technically difficult.

The fact that the reaction temperature for the formation of diamond from hydrocarbon is significantly lower than the temperature required for the direct transformation of graphite into diamond can be explained; as the activation energy required for thermal destruction of hydrocarbon is much lower than graphite, which possesses a highly ordered crystalline frame which is resistant to thermal treatment. The finding that the introduction of chemically bonded hydrogen (naphthalene, $C_{10}H_8$), into the reaction zone filled with graphite (which gives an overall hydrogen-to-carbon atomic ratio of 1:8) causes a reduction in temperature, pressure and time required for the transformation of graphite into diamond is of interest. However the mechanism by which hydrogen influences the synthesis of diamond from graphite is unknown, also the form of hydrogen that participates in the process of diamond formation is unknown and may be atomic or molecular hydrogen, volatile gaseous hydrocarbons, or any combination thereof.

Indirect evidence about the process taking place in the high pressure chamber (HPC) under a high pressure and high temperature (HPHT) has been obtained based upon studies of samples which are isolated after the end of experimentation, that is after the pressure and temperature have been quenched to ambient conditions. However the process of cooling and pressure release may also induce changes, in addition to the transformations which took place under HPHT.

One such indirect observation is that on heating of naphthalene for about 10 seconds at temperature of 600° C. under a pressure of 8 GPa, followed by cooling and lowering the pressure to atmospheric, the reaction product isolated from the HPC is a two-dimensional ordered carbon having a hydrogen content of about 1 wt. % and showing a weight loss of about 24% relative to the starting mass of naphthalene. This weight loss suggests that hydrogen is being removed from the sample, most likely in the form of methane $CH_4$, (although the formation of mixtures of hydrogen and other gaseous hydrocarbons during the decomposition process of naphthalene cannot be excluded).

It therefore seems likely that the gaseous hydrocarbon products of degradation of naphthalene partially remain in the reaction zone up to temperature of 1300° C. and facilitate the formation of diamond from graphite when a pressure of 8 GPa, and a temperature of 1300° C. is reached and maintained for 20 seconds. It is believed therefore, that hydrogen or hydrocarbon gas can participate in the transformation of graphite into diamond, either through deformation of the crystalline frame of graphite by intercalation or by chemical splitting, followed by chemical transport of carbon.

In view of the above cited limitations of conventional methods for diamond synthesis, there is a clear need for a method of producing diamonds that is clearly understood and more efficient than conventional methods. For example, catalysts for diamond synthesis conventionally are metal systems which are used to dissolve the carbon and accelerate conversion of graphite/carbon source to diamond, however such solvent-catalyst systems, result in metal impurities within the diamond lattice structures. Therefore a low temperature, catalyst free method to produce highly pure nano and micron-size diamond powder and doped diamond crystals that requires a significantly lower reaction temperature compared to conventional methods would be particularly well received.

BRIEF SUMMARY OF THE DISCLOSED EMBODIMENTS

These and other needs in the art are addressed in one embodiment by a method for producing a diamond material comprising: contacting a fluorinated precursor with a hydrocarbon in a reactor, in the absence of a catalyst, and forming a combination; increasing the pressure in the reactor to a first pressure; heating the combination under said first pressure to a first temperature; maintaining the first temperature to form a material precursor; cooling the material precursor; and forming a diamond material.

In some embodiments, the ratio of fluorinated precursor to hydrocarbon is 1:10 and in other embodiments the ratio of fluorinated precursor to hydrocarbon is 1:1. In some embodiments, the fluorinated precursor comprises about 15 wt % to about 70 wt % of the combination. In some further embodiments, a fluorinated precursor comprises about 15 wt % to about 45 wt % of the combination, and in some further still embodiments, the fluorinated precursor comprises about 20 wt % of the combination. In some embodiments of the method, the forming of a diamond material is substantially free of catalyst.

In other embodiments, the diamond material formed has an X-ray diffraction pattern comprising peaks at 111, 220 and 311. In further embodiments the diamond material has an X-ray diffraction pattern that is substantially free of peaks at 101 and 100. In some embodiments of the method described herein, the hydrocarbon comprises naphthalenes. In other embodiments, the fluorinated precursor is selected from the group consisting of fluorographite, fluoroaromatics, fluoroaliphatics, hexafluorobenzene, perfluorodecaline, fluoropolymers, poly(tetrafluoroethylene), poly(vinylidene) fluoride, aromatic fluoropolymers, and combinations thereof. In other embodiments of the method, increasing the pressure comprises pressurizing to between about 5 GPa and about 8 GPa.

In other embodiments of the method, increasing the temperature comprises raising the temperature at a rate of about 50° C./min. In further embodiments, maintaining the first temperature comprises applying said temperature for about 10 seconds to about 60 seconds in other embodiments, maintaining the first temperature comprises applying said temperature for about 20 seconds. In some further embodiments, the first temperature is about 500° C. to about 1300° C. and in further still embodiments the first temperature is about 600° C. to about 1100° C. In some embodiments the first temperature is about 1000° C.

In other embodiments of the method, the diamond material is powder, crystalline or combinations thereof, and in further embodiments the diamond material is selected from the group consisting of: doped diamond material or undoped diamond powder, and combinations thereof. In some further embodiments of the method the combination further comprises a dopant, and in some embodiments the dopant is selected from the group consisting of: a Nitrogen containing organic compound, Phosphorus, Nitrogen, Boron, and combinations thereof. In another embodiment, the combination further comprises hexamethylenetetramine.

In other embodiments of the method the dopant is an N-type dopant, and in some embodiment the dopant is a P-type dopant. In further embodiments, the doped diamond comprises N-V (Nitrogen-Vacancy) centers. In some embodiments of the method described herein, the dopant selected is one that causes the doped diamond material to emit fluorescence under UV light, and in other embodiments the diamond material is a biomarker.

Further, in some embodiments of the method described herein, the diamond material is nano-crystalline, microcrystalline or combinations thereof, and in still further embodiments, the diamond material consists of crystals of size 0.3 µm to 13 µm and crystals of size 5 nm to 100 nm which are simultaneously formed. In a further embodiment, the method for producing a diamond material comprises: contacting a fluorinated precursor with a hydrocarbon gas in a reactor, wherein the fluorinated precursor and the hydrocarbon are in a ratio of about 1:1 to about 1:8; and forming a combination in the absence of a catalyst; wherein said combination is comprised of about 10 wt % to about 40 wt % of the fluorinated precursor; increasing the pressure of the reactor to a first pressure; heating the combination under said first pressure to a first temperature; wherein said first temperature is between about 900° C. and about 1100° C.; maintaining the first temperature to form a material precursor; cooling the material precursor; and forming a diamond material.

In some further embodiments a method for producing a diamond material comprises contacting a fluorinated precursor with a hydrocarbon in a reactor, wherein the fluorinated precursor and the hydrocarbon gas are in a ratio of about 1:1 to about 1:8; and forming a combination in the absence of a catalyst; wherein said combination is comprised of about 10 wt % to about 40 wt % of the fluorinated precursor; heating the combination under a first pressure to a first temperature; maintaining the first temperature to form a material precursor; cooling the material precursor; and forming a diamond material and in some still further embodiments of the method the first temperature is between about 900° C. and about 1100° C. In other embodiments a method for producing a diamond material comprises: contacting a fluorinated precursor with a hydrocarbon in a reactor, and forming a combination in the absence of a catalyst; wherein said combination is comprised of about 10 wt % to about 40 wt % of the fluorinated precursor; heating the combination under a first pressure to a first temperature; maintaining the first temperature to form a material precursor; cooling the material precursor; and forming a diamond material and in some further embodiments of the method the first temperature is between about 900° C. and about 1100° C.

The foregoing has outlined rather broadly certain features and characteristics of the disclosed embodiments in order that the detailed description that follows may be better understood. It should be appreciated by those skilled in the art that the conception and the specific embodiments disclosed may be readily utilized as a basis for modifying or designing other structures and methods for carrying out the same purposes as the embodiments disclose. It should also be realized by those skilled in the art that such equivalent constructions do not depart from the spirit and scope of the invention as set forth in the appended claims.

Figure 4:
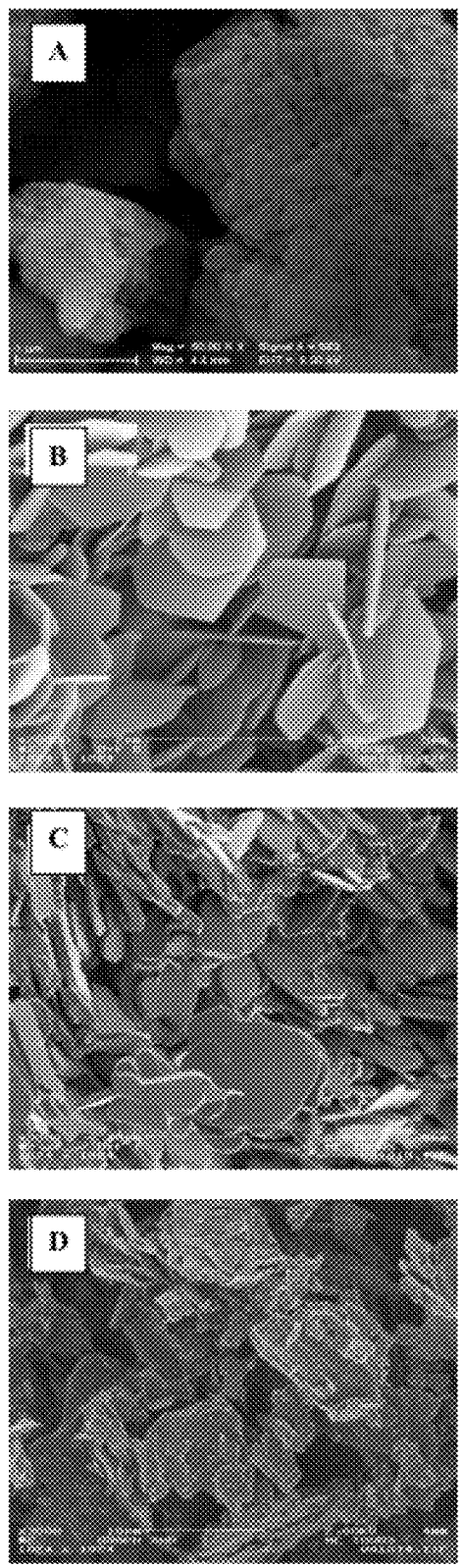
FIG. 4, depicts a comparison of SEM microphotographs of graphite materials obtained by different methods: 4 b) by decomposition of $CF_{1.1}$ at 8 GPa and 1000° C. for 20 sec, (4c)
Figure 5:
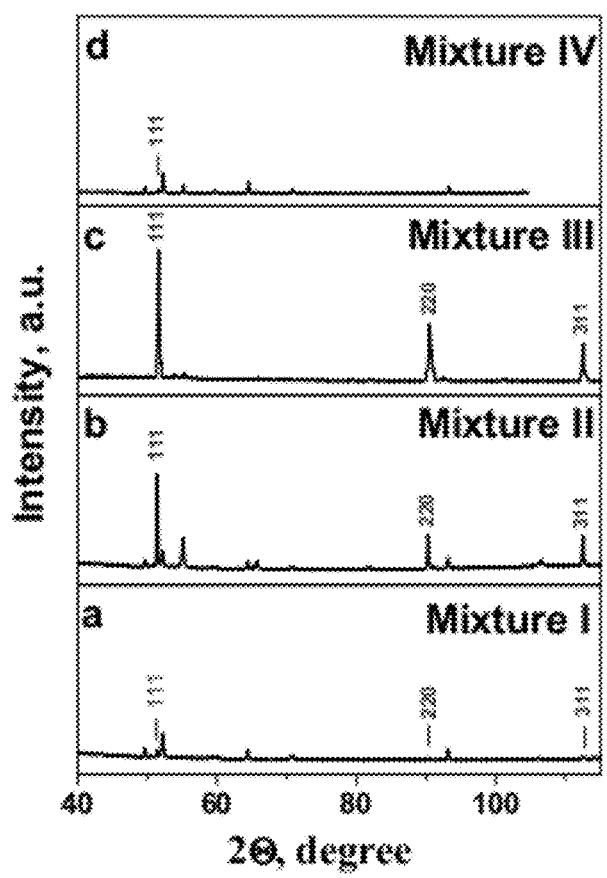
Figure 6:
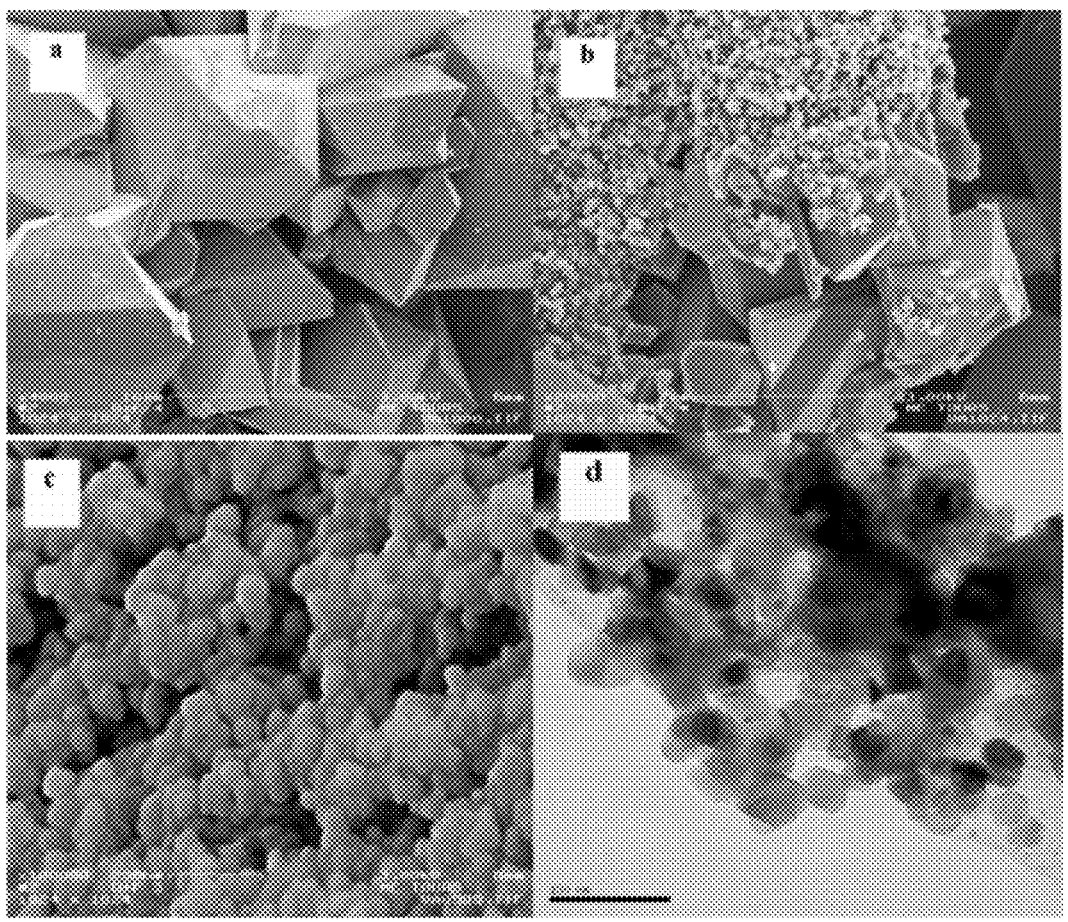
Figure 7:
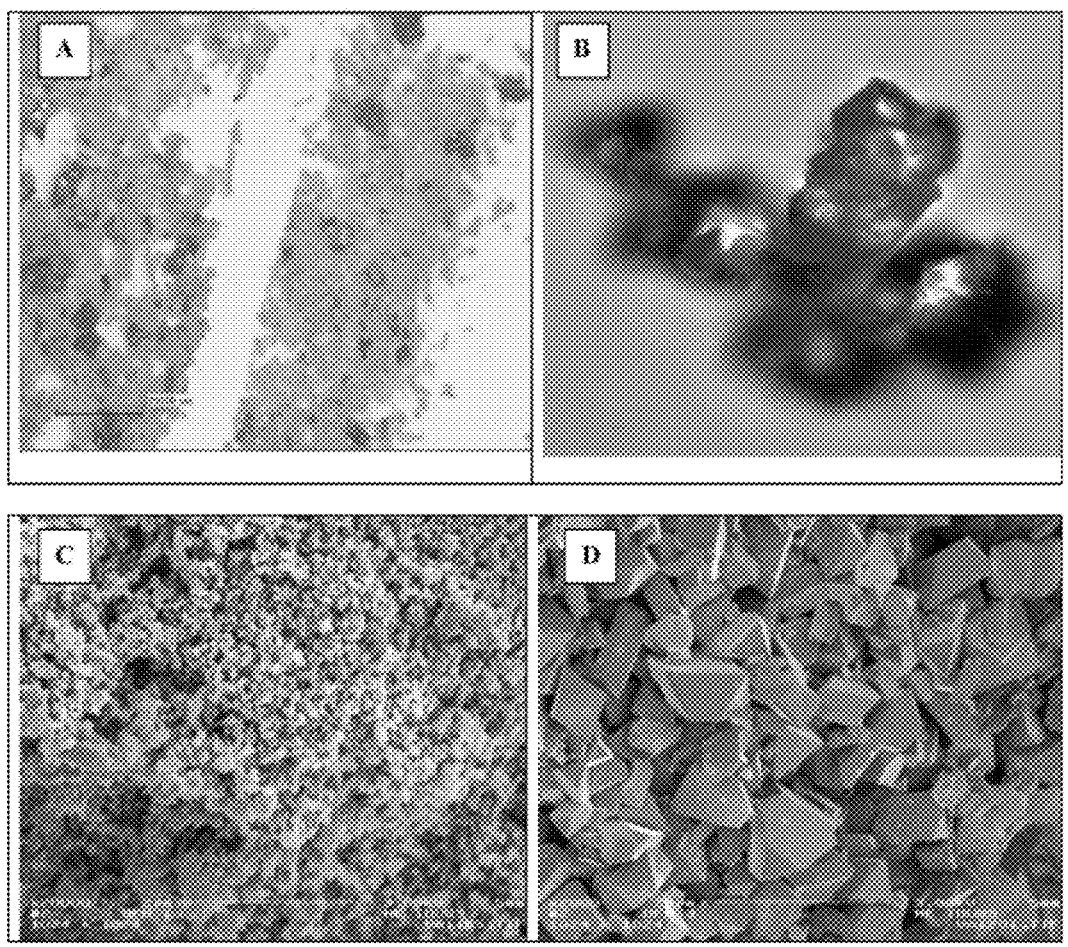

by decomposition of naphthalene $C_{10}H_8$ at 8 GPa and 1200° C. for 20 sec, and (4d) by pyrolysis of hydrocarbon at low pressure in comparison to FIG. 4a, which depicts fluorographite starting material;

FIG. 5. depicts X-ray diffractograms ($CoK_{\alpha 1}$ radiation with $\lambda$=1.7889) of samples produced by thermal decomposition of mixtures I, II, III, and IV (Table 1), in accordance with principles described herein;

FIG. 6. depicts images of samples produced by thermal decomposition of mixture III Images 6a, 6b, and 6c are obtained by scanning electron microscopy, and 6d by transmission electron microscopy, in accordance with principles described herein;

FIG. 7. depicts images of N-doped nano- and microcrystalline diamonds, (7a) is a DHX microscope image, (7b) is fluorescent microscopy image excited by 546 nm light; and SEM images of nanocrystalline (7c) and microcrystalline (7d) diamonds made in accordance with the principles described herein.

DETAILED DESCRIPTION OF DISCLOSED EMBODIMENTS

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form, and some details of conventional elements may be omitted in interest of clarity and conciseness.

In the following discussion and in the claims, the terms "including" and "comprising" are used in an open-ended fashion, and thus should be interpreted to mean "including, but not limited to . . . ". As used herein, the term "about," when used in conjunction with a percentage or other numerical amount, means plus or minus 10% of that percentage or other numerical amount. For example, the term "about 80%," would encompass 80% plus or minus 8%.

In one embodiment, a method for producing a diamond material comprises: contacting a fluorinated precursor with a hydrocarbon in a reactor, in the absence of a catalyst, and forming a combination; increasing the pressure in the reactor to a first pressure; heating the combination under said first pressure to a first temperature; maintaining the first temperature to form a material precursor; cooling the material precursor; and forming a diamond material.

In some embodiments, the ratio of fluorinated precursor to hydrocarbon is 1:10, and in some embodiments the ratio of fluorinated precursor to hydrocarbon is 1:6, and in some further embodiments the ratio is 1.4, and in other embodiments the ratio of fluorinated precursor to hydrocarbon is 1:1. In some embodiments, the fluorinated precursor comprises about 15 wt % to about 70 wt % of the combination. In some further embodiments, a fluorinated precursor comprises about 15 wt % to about 45 wt % of the combination, and in some further still embodiments, the fluorinated precursor comprises about 20 wt % of the combination. In some embodiments of the method, the forming of a diamond material is substantially free of catalyst.

In other embodiments, the diamond material formed has an X-ray diffraction pattern comprising peaks at 111, 220 and 311. In further embodiments, the diamond material has an X-ray diffraction pattern that is substantially free of peaks at 101 and 100. In some embodiments of the method described herein, the hydrocarbon comprises naphthalenes. In other embodiments of the method, the fluorinated precursor is selected from the group consisting of fluorographite, fluoro aromatics, fluoroaliphatics, hexafluorobenzene, perfluorodecaline, fluoropolymers, poly(tetrafluoroethylene), poly(vinylidene) fluoride, aromatic fluoropolymers, and combinations thereof. In other embodiments of the method, increasing the pressure comprises pressurizing to between about 5 GPa and about 8 GPa, and in some embodiments the pressure is at about 8 Gpa.

In other embodiments of the method increasing the temperature comprises raising the temperature at a rate of about 10° C./min. In other embodiments, the temperature is raised at a rate of 25° C./min, and in further embodiments the temperature is raised at a rate of 50° C./min.

In further embodiments, maintaining the first temperature comprises applying said temperature for about 10 seconds to about 60 seconds. In other embodiments, maintaining the first temperature comprises applying said temperature for about 20 seconds. In some further embodiments, the first temperature is about 500° C. to about 1300° C., and in further still embodiments, the first temperature is about 600° C. to about 1100° C. In some embodiments, the first temperature is about 1000° C. In some embodiments of the method for producing a diamond material comprises: contacting a fluorinated precursor with a hydrocarbon in a reactor, wherein the fluorinated precursor and the hydrocarbon are in a ratio of about 1:1 to about 1:8; and forming a combination in the absence of a catalyst; wherein said combination is comprised of about 10 wt % to about 40 wt % of the fluorinated precursor; increasing the pressure in the reactor to a first pressure; heating the combination under said first pressure to a first temperature; wherein said first temperature is between about 900° C. and about 1100° C.; maintaining the first temperature to form a material precursor; cooling the material precursor; and forming a diamond material.

In some further embodiments a method for producing a diamond material comprises contacting a fluorinated precursor with a hydrocarbon in a reactor, wherein the fluorinated precursor and the hydrocarbon are in a ratio of about 1:1 to about 1:8; and forming a combination in the absence of a catalyst; wherein said combination is comprised of about 10 wt % to about 40 wt % of the fluorinated precursor; heating the combination under a first pressure to a first temperature; maintaining the first temperature to form a material precursor; cooling the material precursor; and forming a diamond material and in some still further embodiments of the method, the first temperature is between about 900° C. and about 1100° C. In other embodiments a method for producing a diamond material comprises: contacting a fluorinated precursor with a hydrocarbon in a reactor, and forming a combination in the absence of a catalyst; wherein said combination is comprised of about 10 wt % to about 40 wt % of the fluorinated precursor; heating the combination under a first pressure to a first temperature; maintaining the first temperature to form a material precursor; cooling the material precursor; and forming a diamond material and in some further embodiments of the method the first temperature is between about 900° C. and about 1100° C.

In other embodiments of the method, the diamond material is powder, crystalline or combinations thereof, and in further embodiments the diamond material is selected from the group consisting of: doped diamond material or undoped diamond powder, and combinations thereof. In some further embodiments of the method, the combination further comprises a dopant and in some embodiments the dopant is selected from the group consisting of: a Nitrogen containing organic compound, Phosphorus, Nitrogen, Boron, and combinations thereof in another embodiment the combination further comprises hexamethylenetetramine.

In other embodiments of the method the dopant is an N-type dopant, and in some embodiment the dopant is a P-type dopant. In further embodiments the doped diamond comprises Nitrogen-Valency centers. In embodiments of the method described herein, the dopant selected is one that causes the doped diamond material to emit fluorescence under UV light, and in other embodiments the diamond material is a biomarker.

Further, in some embodiments of the method, described herein, the diamond material is nano-crystalline, microcrystalline or combinations thereof and in still further embodiments, the diamond material consists of crystals of size 0.3 μm to 13 μm and crystals of size 5 nm to 100 nm which are simultaneously formed.

Given the fact that formation of highly ordered graphite is a transformation step preceding the appearance of diamond, it is believed that in binary system, ($1_{fluorographite}:1_{Naphthalene}$) diamond is formed via a mechanism involving nucleation of diamond on hydrogenated edges of graphite particles followed by recrystallization of whole graphite particle into diamond, as proposed for diamond synthesis in hydrocarbon systems. Similar morphology and size of microcrystalline diamond fraction produced at 8 GPa from binary mixtures of $CF_{1.1}$ and naphthalene compared to those of diamonds obtained from pure naphthalene provide additional confirmation for similarity of the mechanisms of microsize diamond formation in fluorine-hydrogen-carbon and hydrocarbon systems. Observed reduction of diamond synthesis temperature in binary systems of $CF_{1.1}$ and naphthalene with respect to pure naphthalene is believed explained by synergistic effect of fluorine-hydrogen chemical interaction on carbonization processes resulting in reduction of graphitization temperature of carbon residues.

In some embodiments, the simultaneous formation of nano- and micronsize diamond fractions has not been observed during high pressure studies of thermal transformations of pure hydrocarbons, and in some embodiments, it is presently believed that binary mixtures formation of nanosize fraction of diamond proceeds through interlayer polymerization of folded carbon layers during the process of carbonization of $CF_{1.1}$ in hydrogen-containing media.

Whereby, in some embodiments, $CF_{1.1}$ structure represents a packing of weakly interacting fluorocarbon layers having their loading frame built from cyclohexane ring $sp^3$ state carbons. Fluorine atoms covalently bonded to carbon atoms form two sublayers which are located above and below the carbon layer itself. Therefore, it is noted that the $CF_{1.1}$ structure originally contains folded layers of $sp^3$-carbon that present the fragments of layers of diamond structure. It is believed that in some further embodiments, compression of the packings of these layers under high pressures with simultaneous removal of fluorine under defined conditions lead to creation of C—C bonds between adjacent layers of $sp^3$ carbon atoms and result in formation of diamond structure. Without limitation by any particular theory, it is believed that cleavage of fluorine-carbon bonds is caused by direct thermal excitation of C—F bonds in some embodiments, and secondly, in further embodiments, that fluorine's break off the surface of carbon layers and are additionally facilitated by exothermic chemical interaction of detached fluorine and hydrogen atoms, producing thermodynamically stable molecules of hydrogen fluoride (HF).

Therefore, embodiments herein are drawn to; a method of making synthetic diamond and synthetic doped diamonds that (a) makes use of a mixture of solid hydrocarbons with fluorocarbons as precursors, (b) does not require the use of a catalyst, (c) reduces by 300° C. the temperature of diamond synthesis as compared to certain conventional methods (d) produces high yields of well-faceted nanosize (9-100 nm) along with a micron size (0.3-13 μm) diamond crystals of high purity, shown by low ash content (typically, 0.1±0.05 wt. %) (5) leads to doped diamonds possessing a bright fluorescence exceeding that of "detonation" diamonds, thereby being particularly suited for biomedical imaging applications, where such diamonds may be used as a non-toxic carbon tags or markers. The following examples of processing conditions and parameters are given for the purpose of illustrating certain exemplary embodiments of the present invention.

EXAMPLES

Fluorographite in the form of refined white-colored powder (supplied by Aldrich Chemical Company) and naphthalene (impurity content less than 0.5%) as acquired from Chemapol, were used as starting materials. In some embodiments, mixtures of $CF_{1.1}$ and naphthalene of different ratios were prepared by thorough mixing and grinding of weighed quantities of starting materials in agate mortar.

The compositions of starting mixtures vary by atomic content ratio of fluorine to hydrogen (F/H) in the range from 1:1 to 1:10. In some embodiments, starting materials in the form of pellets of 4.5 mm diameter and 3 mm thickness were prepared by cold pressing of $CF_{1.1}$ and its binary mixtures with naphthalene at room temperature. In some embodiments, the samples were then inserted into graphite a container. In some further embodiments, the graphite containers were made from substantially pure graphite. In some embodiments, the container also served as a heater for the samples. In other embodiments, Catlinite served both as pressure and transmitting media and electrical and thermal insulator which had no direct contact with the sample.

In some embodiments, treatment of the samples under high pressures and temperature were carried out in a Toroid type apparatus In some other embodiments, the experimental procedure was accomplished by loading the high pressure apparatus to 8 GPa at room temperature, heating of the sample to the desired temperature (with an average heating rate of about 50° C./sec) followed by isothermal exposure of the sample at this temperature. The exposure times were from 20 to 60 seconds. In some embodiments, the temperature in the high pressure cell was measured by chromel/alumel and platinum/platinum-rhodium thermocouples.

In some embodiments, the samples were quenched to room temperature under pressure and after complete pressure release, the products were released and examined. In some embodiments the products were analyzed by X-ray diffraction, scanning and transmission electron microscopes. X-ray diffraction patterns of powder samples were recorded on INEL CPS 120 diffractometer using $CoK_{\alpha 1}$ radiation source.

Microscopy characterization of the samples was carried out on scanning electron microscope (SEM) Ultra plus (Carl Zeiss), equipped with energy dispersive X-ray (EDX) analyzer, and transmission electron microscope (TEM) JEOL JEM-1230 with accelerating voltage of 120 kV.

In some embodiments, the methods of: Yakovlev E. N., Voronov O. A., Diamonds from hydrocarbons, "*Diamonds and ultrahard materials*", 1982, N7, pp. 1-2; Voronov O. A., Gavrilov V. V., Zhulin V. M., Rakhmanina A. V., Khlybov E. P., Yakovlev E. N., Thermal transformations of hydrocarbons under high pressures, *Doklady AN SSSR*, 1984, V. 274, N 1. pp. 100-102; Davydov V. A., Rakhmanina A. V., Agafonov V., Thorel A., Boudou J.-P, Nano-sized carbon modification in the processes of pressure-temperature-induced transformations of hydrocarbons. *Carbon.* 2006, V. 44, pp. 2015-2020 were utilized, and each of those publications is hereby expressly incorporated by reference in its entirety for all purposes. In the event that one or more of the incorporated materials defines a term in a manner that contradicts the definition of that term in this application, this application controls.

Example 1

Figure 1:
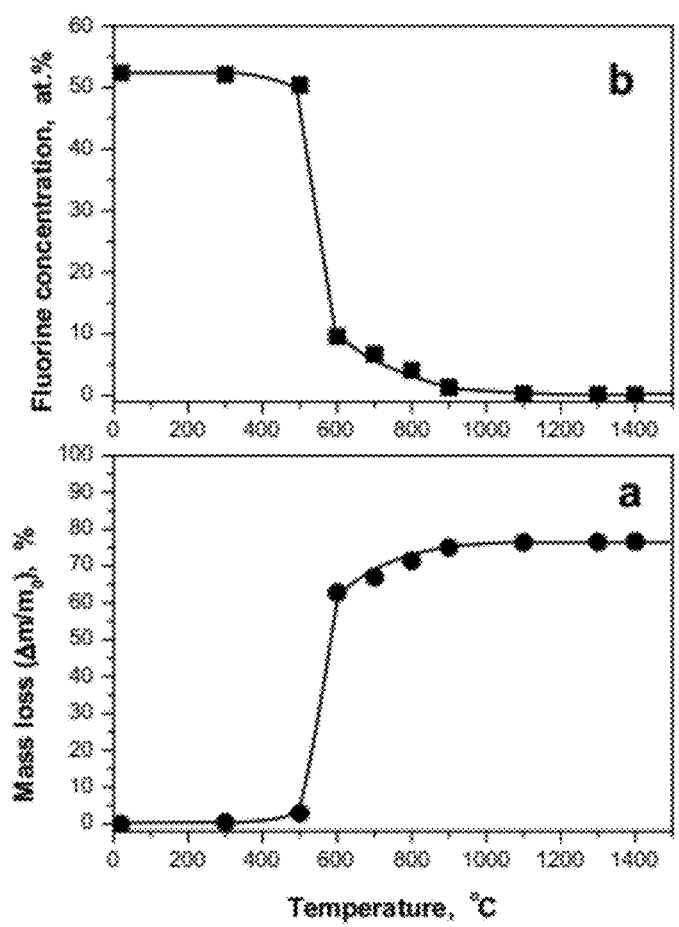
FIG. 1. depicts the mass loss (a) and fluorine content (b) in $CF_{1.1}$ samples measured after heating at 8 GPa for 20 seconds vs. heating temperature.

Carbon Crystallization During Thermal Decomposition of Fluorographite, $CF_{1.1}$ One embodiment of the method herein described, elucidates the mechanism of thermal transformation of fluorographite under a pressure of 8 GPa, whereby FIG. 1*a* depicts a plot of mass loss by fluorographite samples on heating. Most of the fluorine lost by the sample takes place in the temperature range of 500-700° C. The sample heated to 900° C., contained virtually no fluorine (about 0.3%). FIG. 1*b* depicts the corresponding loss of fluorine from the $CF_{1.1}$ sample on heating. The experimental value for the change in mass ($\Delta m/m$) reaches saturation at 900° C. and equals to 76.6%. Given these data, the transformation of $CF_{1.1}$ is described by the following equation:

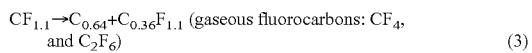
$CF_{1.1} \rightarrow C_{0.64} + C_{0.36}F_{1.1}$ (gaseous fluorocarbons: $CF_4$, and $C_2F_6$) \hfill (3)

Figure 2:
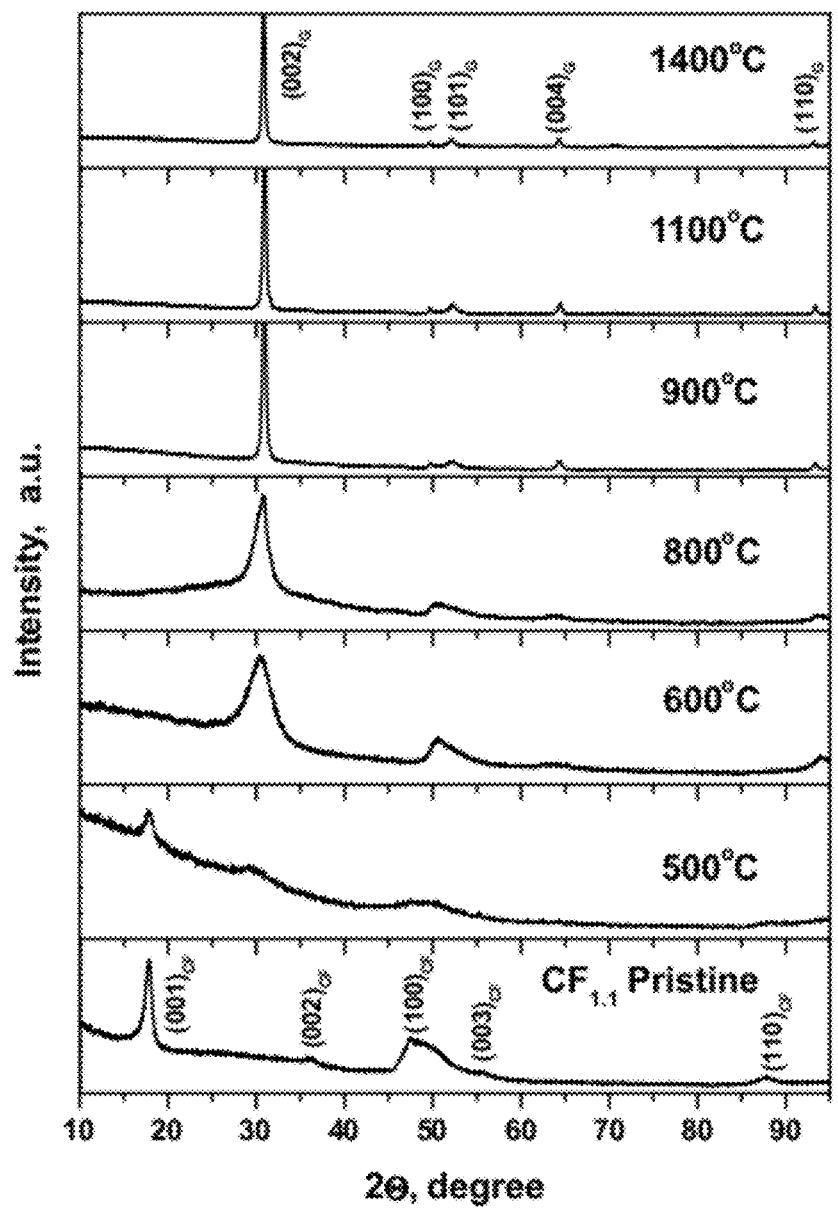
FIG. 2 depicts X-ray diffraction patterns (using $CoK_{\alpha 1}$ radiation, $\lambda=1.7889$ Å) of samples produced by heating $CF_{1.1}$ at different temperatures (25° C., 600° C., 700 ° C., 900° C. and 1100° C. respectively) for a duration of 20 seconds at a pressure of 8 GPa, in accordance with principles described herein.

In further embodiments, X-Ray diffractograms of samples of $CF_{1.1}$ reacted at different temperatures (for 20 seconds) are depicted in FIG. 2.

The XRD pattern of pristine $CF_{1.1}$, prior to heating, (FIG. 2) depicts the layered structure of this material. The main reflections of the diffractogram are of (001) and (hk0) types. The diffractogram does not exhibit reflections of (hk1) type, thus showing lack of distinct three-dimensional (3D) ordering of fluoro-carbon layers. The value of interlayer distance ($d_{001}$) in pristine $CF_{1.1}$ was calculated to be 0.576 nm. Average sizes of crystallites ($L_c$ and $L_a$) of layered packings have been estimated on basis of (001), (002), and (100) reflections by using Scherrer equation (Kinoshita, K. Carbon: electrochemical and physicochemical properties. New York: John Wiley and Sons 1988; Warren, B. E. X-ray diffraction in random layer lattices. *Phys. Rev.* 1941, 59, 693-698). Further, the average lateral size of fluorocarbon layer ($L_a$) is 4.9 nm, and thickness of the packings in the direction perpendicular to the layer ($L_c$) is 9.7 nm. Layered flake-like character of starting material is depicted in the SEM image of FIG. 4*a*.

In some embodiments, samples treated at temperatures below 600° C., are similar the starting material $CF_{1.1}$, as illustrated by the absence of narrow diffraction peaks, indicative of a predominant amorphous phase. As the temperature increases, the amorphous component decreases, and at 600° C., peaks (002) and (10) become apparent, that are characteristic of two-dimensional carbon (FIG. 2).

Further, the diffractogram depicted in FIG. 2 is representative of the reaction products formed at a temperature of 900° C., and indicative of the predominance of three-dimensional carbon (graphite) and are shown in FIG. 2 at temperatures of 1100° C. and 1400° C., respectively.

Figure 3:
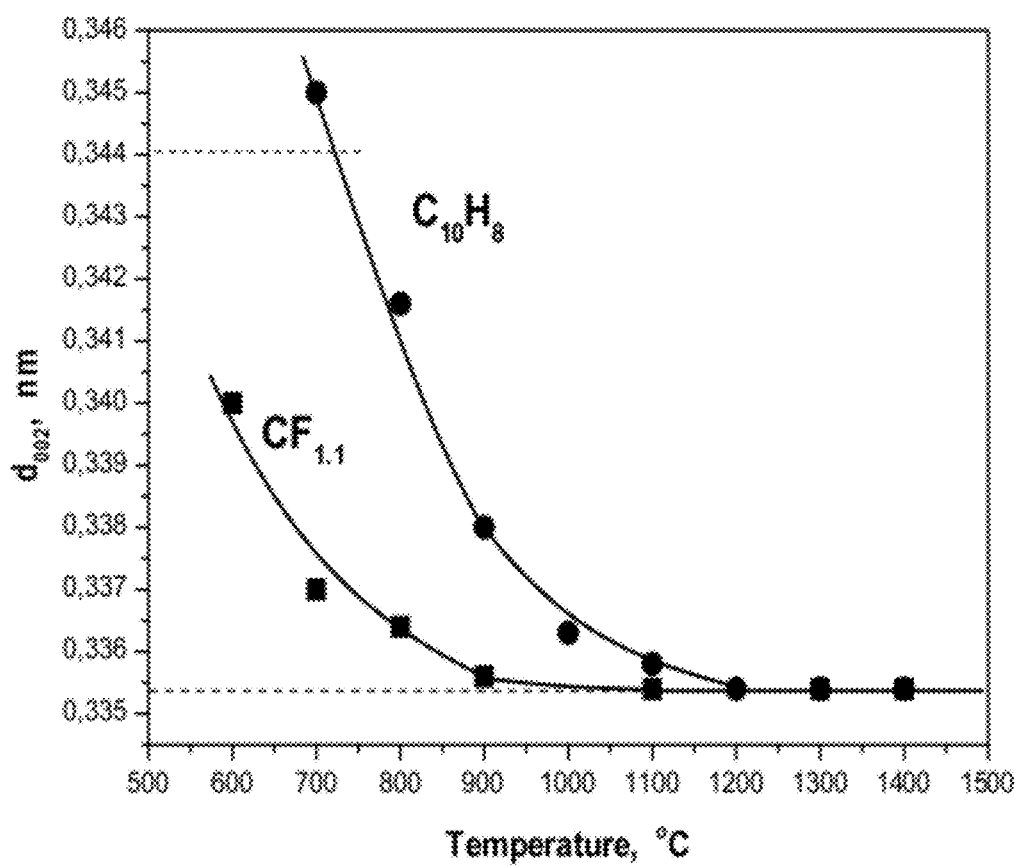
FIG. 3 is a comparison of plots depicting temperature dependence of graphene interplanar distance $d_{002}$ in carbon materials, produced by thermal degradation of naphthalene under pressure of 8 GPa, heating for 60 seconds for $C_{10}H_8$ (as known in the art) and fluorographite $CF_{1.1}$ under pressure of 8 GPa. for 20 seconds in accordance with principles described herein.

In another embodiment of the method described herein, the thermal decomposition of $CF_{1.1}$ produces a graphite product with a $d_{002}$ distance close to that of a crystalline graphite value of 3.3354 Angstrom at 900° C. FIG. 3 shows a comparison of the change in the interplanar distance $d_{002}$ as a function of temperature. The top dashed line in FIG. 3 corresponds to $d_{002}$ distance at which the diffraction peak 10, of two-dimensionally ordered carbon (FIG. 2) splits up and shows peaks at 100 and 101 which are typical for graphite, while the bottom dashed line corresponds to the theoretical $d_{002}$ distance of graphite. The thermal decomposition of $CF_{1.1}$ as described herein produced graphite with $d_{002}$ distance close to theoretical values, at temperatures as low as 900° C., over 20 seconds.

In another embodiment of the method described herein, the method leads to the formation of graphite crystals with hexagon-faceted morphology. FIG. 4*b* shows a SEM microphotograph of the crystallites of graphite formed from $CF_{1.1}$ under a pressure of 8 GPa and at a temperature of 1000° C. The graphite crystallites exhibit a hexagon-faceted morphology. Conventionally, graphite crystals obtained by thermal decomposition of naphthalene and other solid hydrocarbons typically appear as platelets having curved edges such as those depicted in FIG. 4*c*. The difference in morphology for the crystallites shown in FIGS. 4*b* and 4*c* illustrates differences in the chemical composition and the effect that gaseous environments created during decomposition of (a) $CF_{1.1}$ and (b) $C_{10}H_8$ at 8 GPa created by embodiments of the method herein described.

For comparison, FIG. 4*d* further shows a microphotograph of commercial graphite from which fluorographite $CF_{1.1}$ is synthesized by fluorination. The photograph shows that the microstructure of this graphite sample is substantially different from the microstructure of graphite produced through thermal decomposition of $CF_{1.1}$ under a pressure of 8 GPa.

In other embodiments, fluorographite can be substituted by fluoroaromatic and fluoroaliphatic compounds, e.g., hexafluorobenzene, perfluorodecaline, and fluoropolymers, such as poly(tetrafluoroethylene), poly(vinylidene) fluoride, and aromatic fluoropolymers as starting materials in the methods herein described.

Example 2

Diamond Formation by Thermal Decomposition of Homogeneous Mixtures of Fluorographite and Naphthalene In some embodiments, decomposition of $CF_{1.1}$ and $C_{10}H_8$ proceed within similar and overlapping temperature ranges.

$aCF_{1.1} + b\ C_{10}H_8$ \hfill (4)

Without being limited to any particular theory, it is believed that, in some embodiments of the method herein described, hydrogen and fluorine atoms simultaneously cleave from the components of reaction mixture (4) at a temperature range of 500-600° C., thereby forming hydrogen fluoride, HF. The formation of HF facilitates transient formation of carbon atoms with dangling bonds. In some embodiments, where P and T are within the region of thermodynamic stability of diamond, these carbon atoms then crystallize into a diamond structure. Combination of such reactions during chemical decomposition of mixture (4) produce favorable parameters for diamond synthesis that, in some embodiments, significantly lowers the reaction temperature for diamond synthesis.

TABLE 1

Relative content (yield) of diamond ($V_d$) in carbon residue resulting from thermobaric decomposition of fluorographite and naphthalene (4) under heating at 1000° C. for 20 sec at 8 GPa.

| Number of mixture | Composition of mixture | Content of $CF_{1.1}$ in the mixture, wt. % | Yield of diamond $V_d$, vol. % | $I_{002}/I_{101}$ from XRD |
|---|---|---|---|---|
| I | 7.27 $CF_{1.1}$ + $C_{10}H_8$ | 65.1 | 15 | 9.08 |
| II | $CF_{1.1}$ + 0.45 $C_{10}H_8$ | 36.35 | 30 | 10.04 |
| III | $CF_{1.1}$ + $C_{10}H_8$ | 20.45 | 100 | — |
| IV | 0.724 $CF_{1.1}$ + $C_{10}H_8$ | 15.7 | 5 | 13.17 |

In another embodiment of the methods herein, the ratio of a and b as described in equation (4) are varied. Table 1 shows four mixtures of fluorographite and naphthalene. All experiments were carried out under pressure of 8 GPa and a temperature of 1000° C. for 20 seconds. The data shows that diamond is found in the carbon residue produced from all four mixture compositions. The highest yield of diamond is obtained from mixture III, a 1:1 ratio of $CF_{1.1}$ and $C_{10}H_8$, where a full transformation of carbon residue into diamond occurred. A fine white-colored diamond powder inside the graphite container was observed, and the X-ray diffractogram of the carbon residue displayed characteristic diamond features (FIG. 5c).

In some embodiments, the X-ray diffractograms of carbon residue from mixture III exhibited very weak traces of 101 peak of lonsdelite, and peaks 101 and 012 of rhombohedral graphite. At the same time, no traces of 100 peak of lonsdelite and 003 of rhombohedral graphite could be observed.

Diamond crystals and powders produced by embodiments of the method herein described are depicted in FIG. 6, which show photographs taken with scanning (FIGS. 6 a, b, c) and transmission (FIG. 6d) electron microscopes of the sample produced from mixture III ($CF_{1.1}$: $C_{10}H_8$ ratio of 1:1). FIG. 6a, depicts the crystallization of carbon into a micropowder of octahedra-shaped grains with a size range of 0.3-13 microns.

FIG. 6b depicts an area of the sample where micron-sized diamond crystals are located adjacent to nano particles of diamond powder. The nano particles are further shown in high resolution in FIG. 6c (by scanning electron microscopy) and also in FIG. 6d (by transmission electron microscope). The sizes of diamond nano particles are in the range of 9-100 nm. In some embodiments nano particles in the 14-20 nm size range are already well-faceted and demonstrate shapes such as octahedra, octahedral cuts, and transparent twin hexagonal plates that are conventionally seen only for larger size diamond crystals.

In some further embodiments, mixtures (I, II, and III of Table 1), were reacted under pressure of 8 GPa and a temperature of 1000° C. for 20 seconds, whereby the yield of diamond was found to depend on the composition of the mixture.

In some embodiments the relative volume $V_d$ occupied by the diamond phase in the carbon residue was determined and compared with that of the total volume of the sample. These values are shown in the Table 1, and are identified and quantified based on the color of the phase, i.e. the diamond phase being white and the non-diamond being black.

In some embodiments, the carbon residue crystallized into a structure of hexagonal graphite. X-Ray diffractograms of carbon residues obtained from mixtures I, II, and IV of Table 1 (FIGS. 5a, 5b, 5d respectively) show, in addition to peaks at 111, 220, and 311 corresponding to diamond, a larger set of peaks (002, 100, 101, 102, 004, 110, and 006) which are characteristic of hexagonal graphite. In some embodiments, the highest intensity is observed for the 002 graphite peak Therefore, the data on intensities of 002 peaks as presented in Table 1 are a ratio of intensities of 002 over 101 graphite peaks ($I_{002}/I_{101}$).

In some embodiments, the interlunar distance $d_{002}$, from mixtures I, II, and IV determined from the position of 002 diffraction peak, are found to be identical (0.3358±0.0001 nm) to that found in the graphite phases produced from mixtures I, II, and IV.

In further embodiment, FIG. 5a clearly shows the 111 peak of diamond and traces of its 220 and 311 peaks. The 111 diamond peak is located between 100 and 101 peaks of graphite, however, its intensity is significantly lower than the intensities of the characteristic graphite peaks.

X-Ray diffractograms of mixtures II and III (FIGS. 5b and 5c) demonstrate a steady growth in intensity of characteristic diamond peaks along with the relative weakening and total disappearance of characteristic graphite peaks. The reaction products of mixture IV (FIG. 5d), contain only a single and weak 111 diamond peak besides the diffraction peaks of graphite, which indicates a low yield of diamond product.

In some embodiments the dependence of the yield of diamond on the relative content of $CF_{1.1}$ in the starting mixture is believed to be significant. When the $CF_{1.1}$ content in the starting mixture is decreased from about 65 wt. %, to about 20 wt. %, the yield of diamond increases from 15% to 100%. However, if $CF_{1.1}$ content in the starting material is further decreased from about 20% to about 16 wt. % a sharp decline of the yield of diamond to as low as 5% is observed., as seen in Table 1.

In some embodiments, of the method herein described, variations in the temperature and the ratio of hydrogen, fluorine, and carbon in the reaction zone of the apparatus produce significant changes in the kinetics and thermodynamics of the subsequent reactions. In some embodiments, selectively controlling these parameters can facilitate a preferred crystallization of carbon to yield a preferred diamond product.

Therefore as described herein, in some embodiments, the thermal transformations of homogeneous mixtures of $CF_{1.1}$ with naphthalene under high pressures are characterized by a notable decrease of graphitization temperature of carbonization products of both components in the mixture and substantial decline of initial temperature threshold for diamond synthesis, as compared to pure hydrocarbon growth systems.

In some embodiments herein described, fluorographite can be substituted by fluoroaromatic and fluoroaliphatic compounds, e.g., hexafluorobenzene, perfluorodecaline, etc, and fluoropolymers, such as poly(tetrafluoroethylene), poly(vinylidene) fluoride, and aromatic fluoropolymers. Naphthalene can be substituted by other aromatic and non-aromatic hydrocarbons, anthracite, phenanthrene, adamanthane, and polyolefines, such as polyethylene, polypropylene, polystyrene, etc. Some embodiments described herein therefore provide a catalyst-free, low temperature diamond synthesis, from mixtures of commercial and residential waste fluoropolymers and polyolefins.

Example 3

High Pressure, High Temperature Synthesis of Doped Diamond

In another embodiment of the method herein described, a process is disclosed for the synthesis (under high static pressures) of diamonds doped with elements such as, but not limited to boron, nitrogen or phosphorus atoms in absence of metal impurities is disclosed. Such N-Doped diamonds (whereby the dopant atoms are capable of providing extra conduction electrons to the host material creating an excess of negative (n-type) electron charge carriers) possess high fluorescent properties, which make materials produced by the embodiments as herein described, suitable for applications such as unbleached intracellular tags (or biomarkers).

In some embodiments, diamonds synthesized with several different dopants are made by using binary mixtures of hydrocarbons (that is: $\alpha\ CF_{1.1} + b\ C_{10}H_8$) combined with different doping elements such as, but not limited to B, N, or P, which may come from either their corresponding organic compounds, or from more complex, multicomponent mixtures of hydrocarbons with fluorographite and Nitrogen containing organic compounds. Doped diamonds produced by embodiments herein described are depicted in FIG. 7. Studies of the optical properties of these synthesized doped diamonds have shown that the synthesis of doped diamonds by such embodiments described herein, successfully produce diamonds doped with high contents of different dopants.

Taking into account that fluorescent properties of diamond are controlled mainly by abundance of N-V centers in the sample (whereby the nitrogen-vacancy (N-V) center is a point defect in the diamond lattice and consists of a nearest-neighbor pair of a nitrogen atom, which substitutes for a carbon atom, and a lattice vacancy). Therefore some embodiments described herein, provide a process for synthesizing N-doped diamonds, which possess a bright fluorescence (which considerably exceeds that of "detonation" diamonds). An example of a product of such an embodiment is depicted in FIG. 7B whereby a fluorescence microscopy image of an N-doped diamond sample, synthesized by a reactive system comprised of fluorographite-naphthalene-hexamethylenetetramine $C_6H_{12}N_4$ is presented.

While the methods described here focus on methods for a catalyst-free synthesis of high purity nano-and micron-size diamond powder and doped diamonds, one of ordinary skills in the art, with the benefit of this disclosure, would recognize the extension of the approach to other types of carbon-based materials for diverse applications, including but not limited to, biomedical imaging applications where doped diamonds can be used as non-toxic fluorescent tags or markers.

The particular embodiments disclosed above are merely illustrative, and may be modified and practiced in different but equivalent manners apparent to those skilled in the art having the benefit of the teachings herein. Furthermore, no limitations to the present invention are intended, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

The disclosures of all patents, patent applications, and publications cited herein are hereby incorporated herein by reference in their entirety, to the extent that they provide exemplary, procedural, or other details supplementary to those set forth herein.

We claim:

1. A method for producing a diamond material comprising:
   contacting a fluorinated precursor with a hydrocarbon in a reactor, in the absence of a catalyst, and forming a combination;
   increasing the pressure in the reactor to a first pressure;
   heating the combination under said first pressure to a first temperature;
   maintaining the first temperature to form a material precursor;
   cooling the material precursor; and forming a diamond material.

2. The method of claim 1, wherein the ratio of fluorinated precursor to hydrocarbon is 1:10.

3. The method of claim 1, wherein the ratio of fluorinated precursor to hydrocarbon is 1:1.

4. The method of claim 1, wherein the fluorinated precursor comprises about 15 wt % to about 70 wt % of the combination.

5. The method of claim 1, wherein the fluorinated precursor comprises about 15 wt % to about 45 wt % of the combination.

6. The method of claim 1, wherein the fluorinated precursor comprises about 20 wt % of the combination.

7. The method of claim 1, wherein said diamond material has an X-ray diffraction pattern comprising peaks at 111, 220 and 311.

8. The method of claim 1, wherein said diamond material has an X-ray diffraction pattern substantially free of peaks at 101 and 100.

9. The method of claim 1, wherein the hydrocarbon comprises naphthalenes.

10. The method of claim 1, wherein the fluorinated precursor is selected from the group consisting of fluorographite, fluoroaromatics, fluoroaliphatics, hexafluorobenzene, perfluorodecaline, fluoropolymers, poly(tetrafluoroethylene), poly(vinylidene) fluoride, aromatic fluoropolymers, and combinations thereof.

11. The method of claim 1, wherein increasing the pressure comprises pressurizing to between about 5 GPa and about 8 GPa.

12. The method of claim 1, wherein increasing the temperature comprises raising the temperature at a rate of about 50° C./min.

13. The method of claim 1, wherein maintaining the first temperature comprises applying said temperature for about 10 seconds to about 60 seconds.

14. The method of claim 13, wherein maintaining the first temperature comprises applying said temperature for about 20 seconds.

15. The method of claim 1, wherein said first temperature is about 500° C. to about 1300° C.

16. The method of claim 1, wherein said first temperature is about 600° C. to about 1100° C.

17. The method of claim 1, wherein said first temperature is about 1000° C.

18. The method of claim 1, wherein the diamond material is powder, crystalline or combinations thereof.

19. The method of claim 1, wherein the diamond material is selected from the group consisting of: doped diamond material or undoped diamond powder, and combinations thereof.

20. The method of claim 1, wherein the combination further comprises a dopant.

21. The method of claim 20, wherein the dopant is selected from the group consisting of: a Nitrogen containing organic compound, Phosphorus, Nitrogen, Boron, and combinations thereof.

22. The method of claim 1, wherein the combination further comprises hexamethylenetetramine.

23. The method of claim 21, wherein the dopant is an N-type dopant.

24. The method of claim 21, wherein the dopant is a P-type dopant.

25. The method of claim 19, wherein the doped diamond comprises Nitrogen-Vacancy centers.

26. The method of claim 21, wherein the dopant selected, is one that causes the doped diamond material to emit fluorescence under UV light.

27. The method of claim 19, wherein the diamond material is a biomarker.

28. The method of claim 1, wherein the diamond material is nanocrystalline, microcrystalline or combinations thereof.

29. The method of claim 28, wherein the diamond material consists of crystals of size 0.3 µm to 13 µm and crystals of size 5 nm to 100 nm simultaneously formed.

30. A method for producing a diamond material comprising:
   contacting a fluorinated precursor with a hydrocarbon in a reactor, wherein the fluorinated precursor and the hydrocarbon are in a ratio of about 1:1 to about 1:8; and
   forming a combination in the absence of a catalyst; wherein said combination is comprised of about 10 wt % to about 40 wt % of the fluorinated precursor;
   heating the combination under a first pressure to a first temperature;
   maintaining the first temperature to form a material precursor;
   cooling the material precursor; and forming a diamond material.

31. The method of claim 30, wherein the first temperature is between about 900° C. and about 1100° C.

32. A method for producing a diamond material comprising:
   contacting a fluorinated precursor with a hydrocarbon in a reactor, and forming a combination in the absence of a catalyst; wherein said combination is comprised of about 10 wt % to about 40 wt % of the fluorinated precursor;
   heating the combination under a first pressure to a first temperature;
   maintaining the first temperature to form a material precursor;
   cooling the material precursor; and forming a diamond material.

33. The method of claim 32, wherein the first temperature is between about 900° C. and about 1100° C.

\* \* \* \* \*